United States Patent [19]
Cocchi et al.

[11] Patent Number: 5,603,229
[45] Date of Patent: Feb. 18, 1997

[54] MACHINE FOR MAKING CRUSHED ICE DRINKS

[75] Inventors: Gino Cocchi, Bologna; Giancarlo Pietra, Casalecchio di Reno, both of Italy

[73] Assignee: Carpigiani Group-Ali S.p.A., Italy

[21] Appl. No.: 541,584

[22] Filed: Oct. 10, 1995

[30]      Foreign Application Priority Data

Nov. 3, 1994 [IT] Italy ................................. GE94A0122

[51] Int. Cl.⁶ ........................................................ A23G 9/12
[52] U.S. Cl. ............................ 62/343; 366/144; 366/309
[58] Field of Search ..................... 62/342, 343; 366/144, 366/147, 149, 309–313

[56]             References Cited

U.S. PATENT DOCUMENTS

| | | | |
|---|---|---|---|
| 2,735,276 | 2/1956 | Thompson, Jr. | 62/342 |
| 2,810,557 | 10/1957 | Phelan | 62/342 |
| 4,241,590 | 12/1980 | Martineau | 62/343 |
| 4,900,158 | 2/1990 | Ugolini | 366/143 |
| 5,074,125 | 12/1991 | Schifferly | 62/342 |

*Primary Examiner*—William E. Tapolcai
*Attorney, Agent, or Firm*—Larson and Taylor

[57]                ABSTRACT

Machine for making crushed ice drinks comprising a tank with horizontal axis provided at one end with means for dispensing the iced product, and internally housing a refrigerating element consisting of a hollow metal cylinder with double-walled shell housing the evaporator of a refrigerator unit in the gap between the two walls, a transporter screw being housed in the axial cavity of the said cylinder. The outer shell of the said cylinder is surrounded by a stirrer element consisting of one or more radial ribs or fins parallel to the directrices of the cylinder which are made to rotate right around the said cylinder, a series of blades able to exert a positive axial thrust on the product to be delivered towards the said dispensing means also being provided at that end of the said stirrer device facing the dispensing means of the said tank.

10 Claims, 4 Drawing Sheets

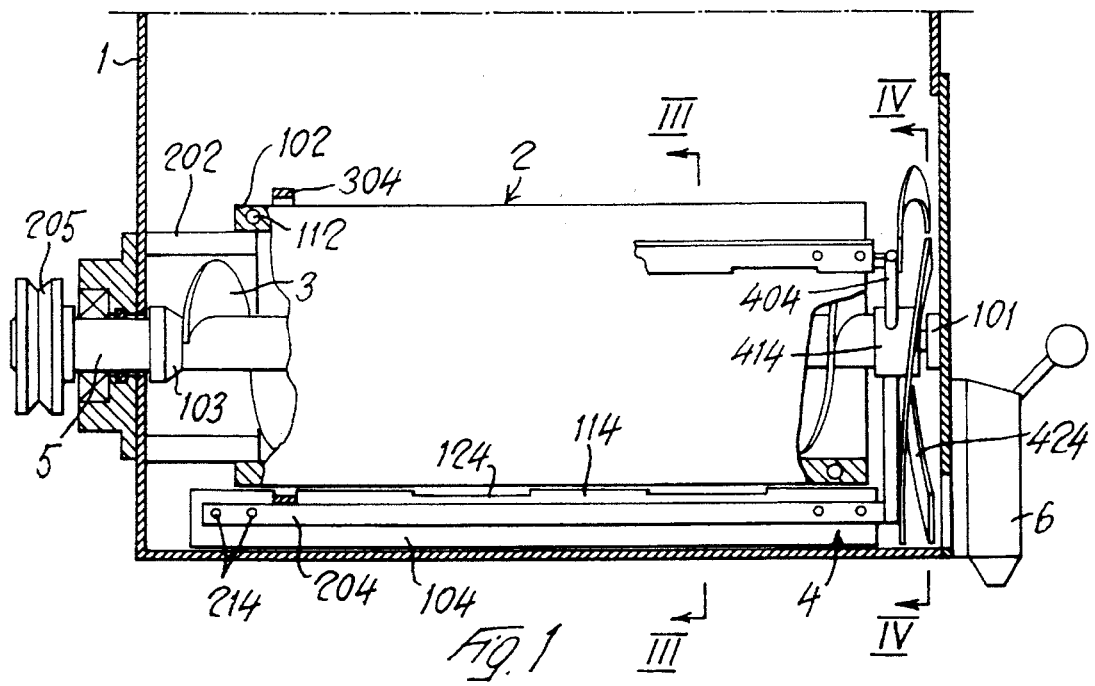
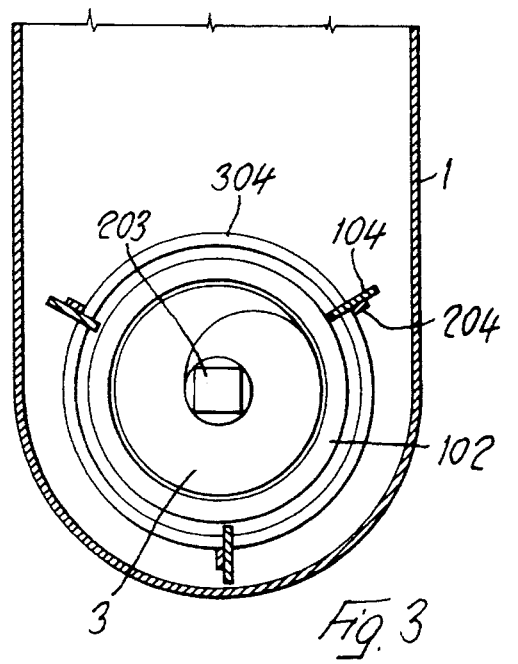
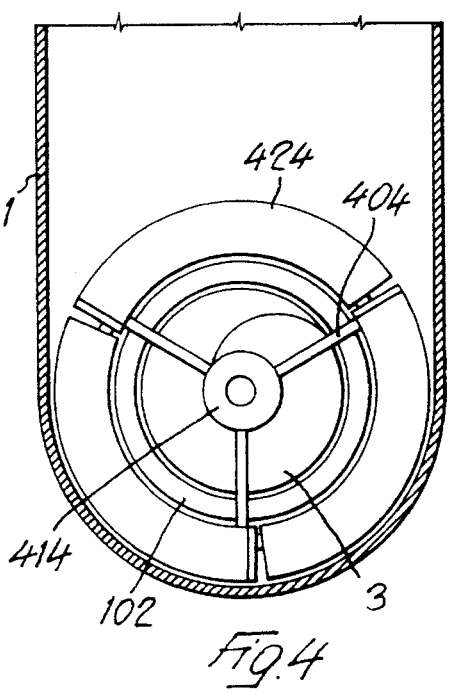

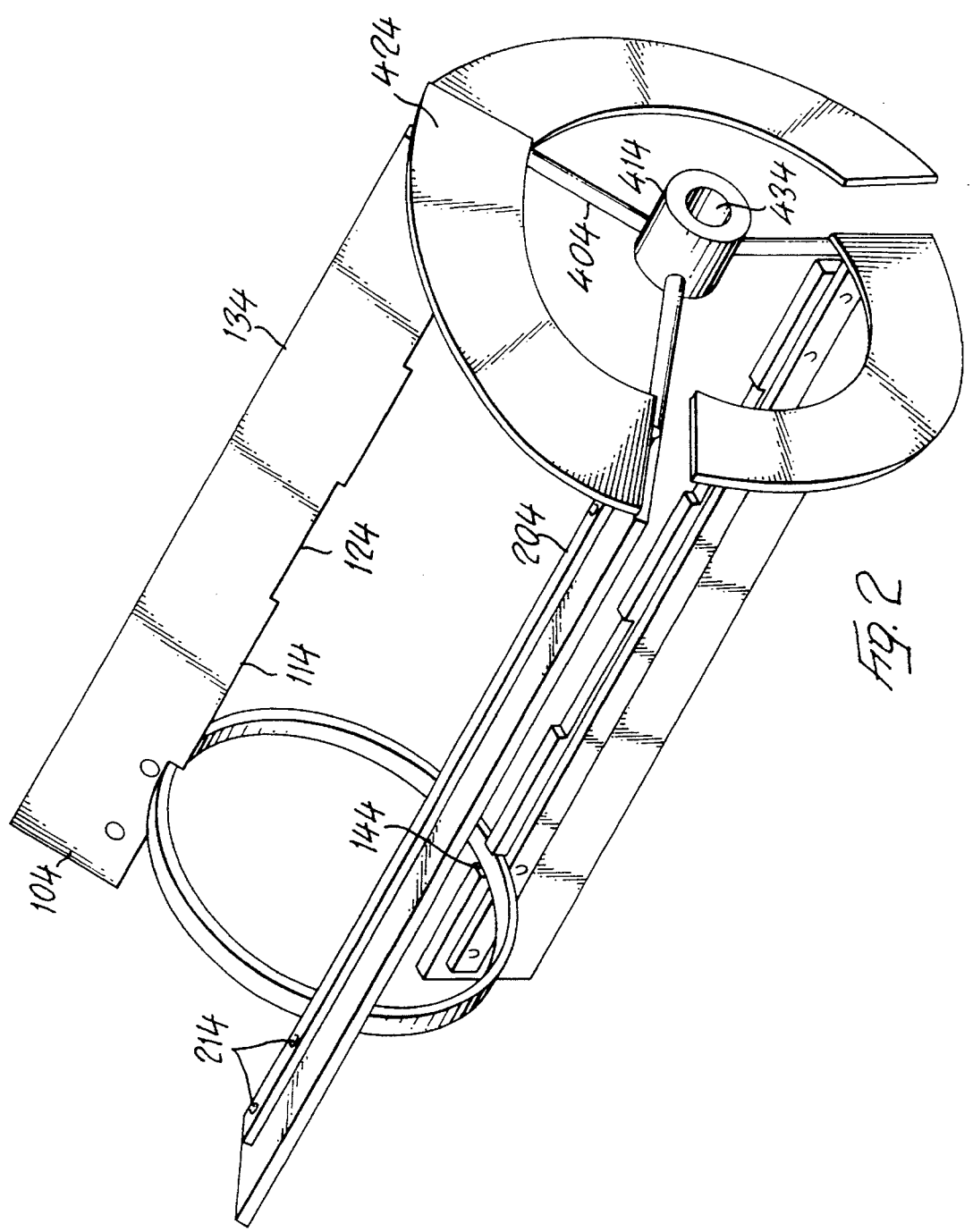

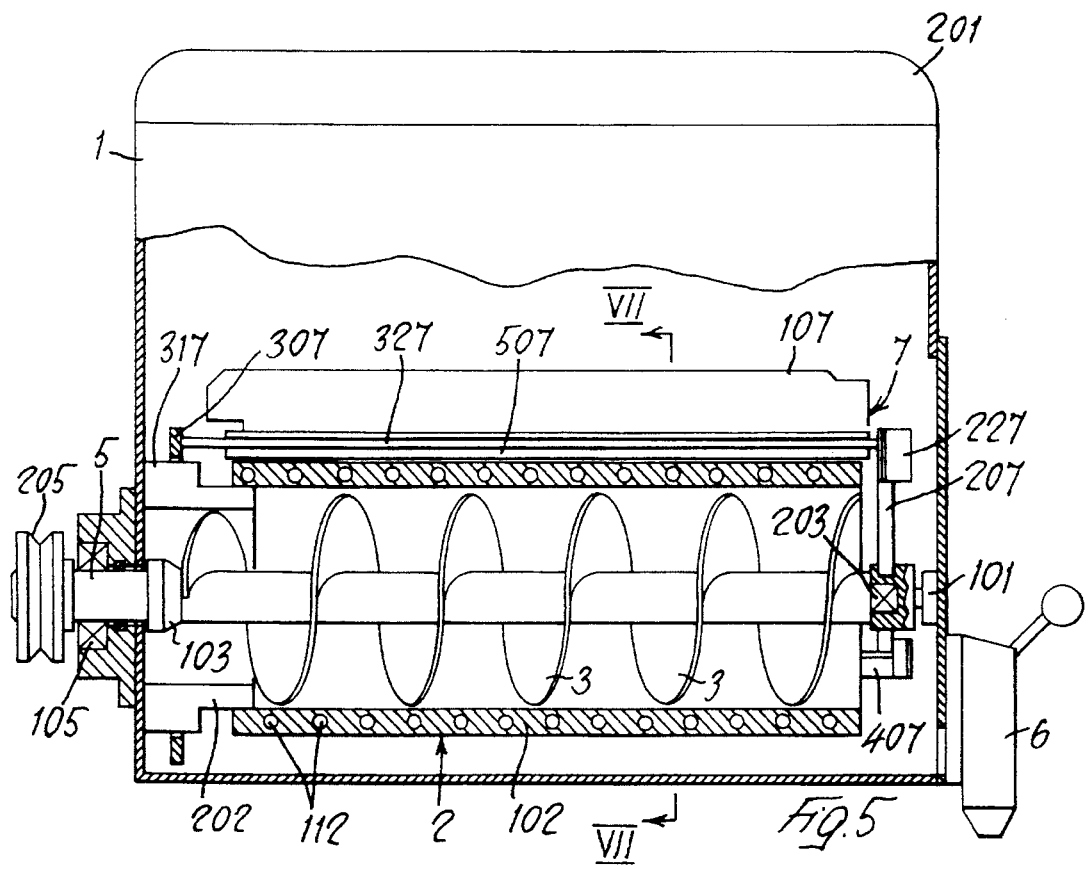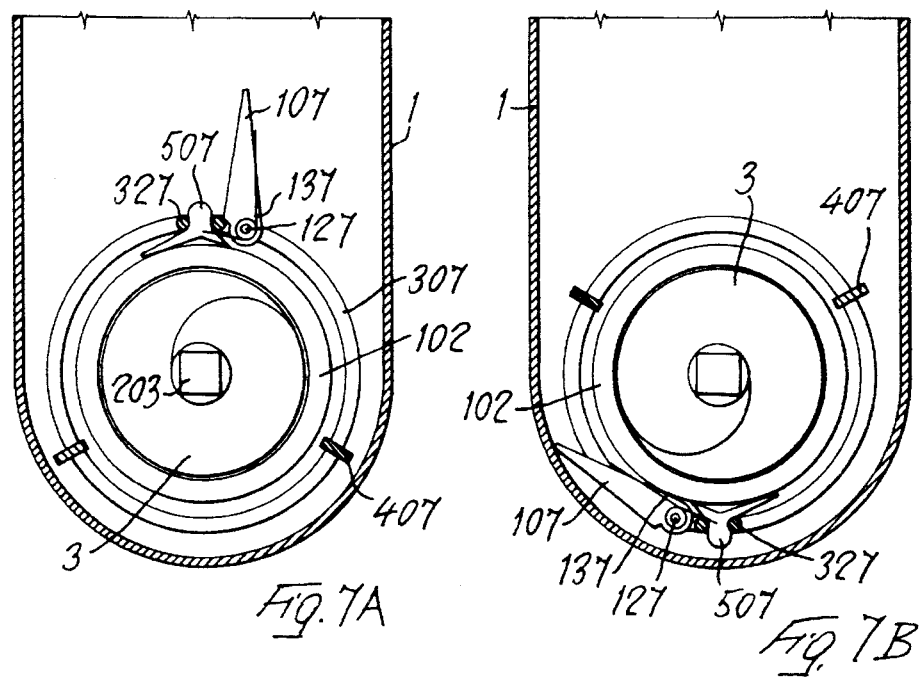

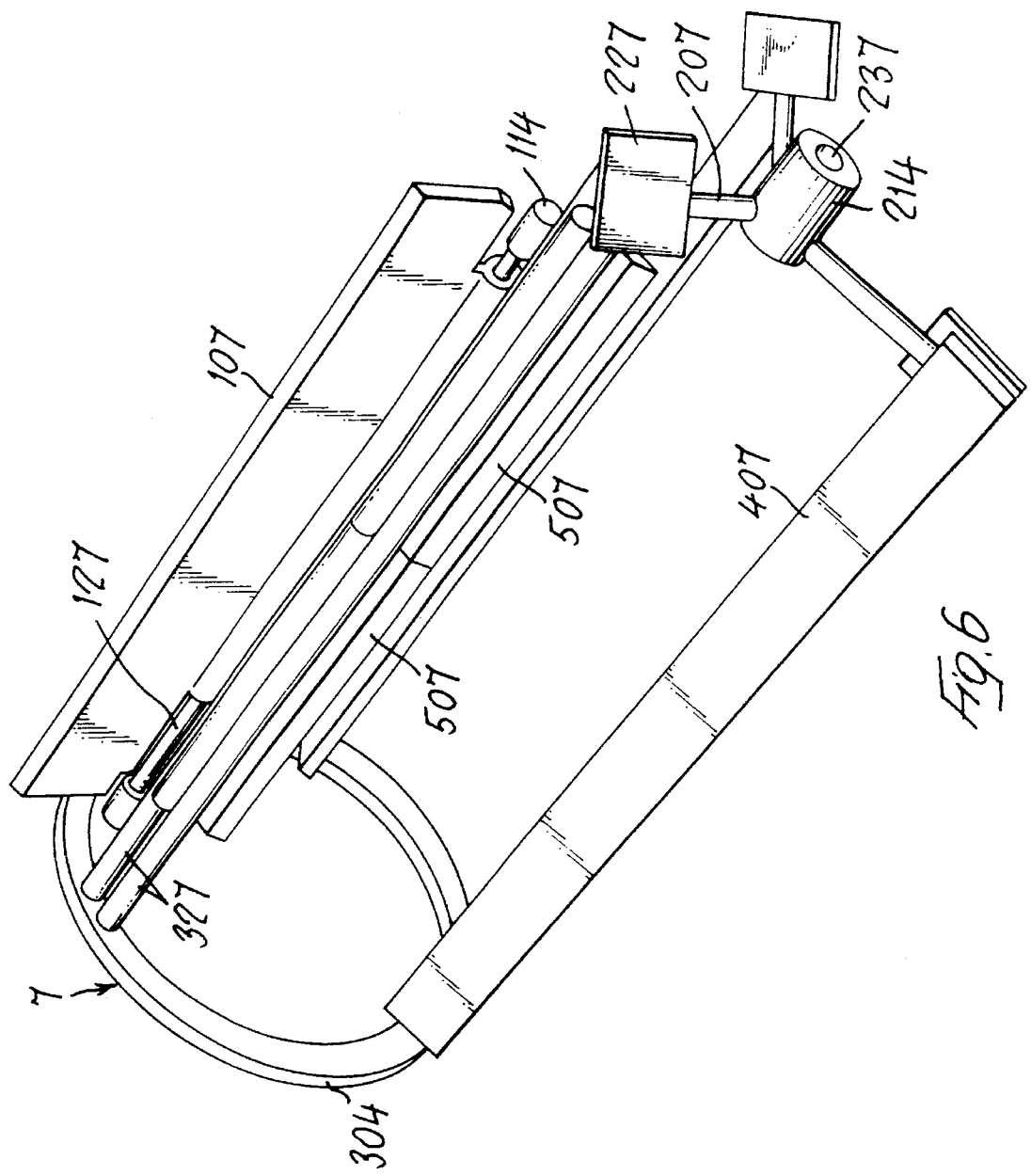

MACHINE FOR MAKING CRUSHED ICE DRINKS

BACKGROUND AND SUMMARY OF THE INVENTION

The present invention relates to a machine for making crushed iced drinks also known as "Sicilian style" crushed ice drinks.

There are various types or "classes" of machine for making crushed ice drinks, and for example there are machines which comprise a refrigerated tank, within which a stirrer rotates, or else there are machines which comprise a tank with vertical axis, within which is housed a cylinder, likewise with vertical axis, internally housing the evaporator of a refrigerator unit, cooperating with means for stirring the surrounding liquid to be frozen, or there are also machines fitted with a freezing chamber with horizontal axis. The subject of the present invention is a machine of this last type.

In the field of so-called horizontal crushed ice drinks makers, machines for making crushed ice drinks are known which comprise a metal freezing cylinder with horizontal axis in a relationship of heat exchange with the evaporator of a refrigerator circuit, internally housing means for stirring the mixture for the preparation of the frozen crushed ice drink. However, such machines have disadvantages from the maintenance point of view, in so far as the inside of the freezing cylinder can only be reached by opening the front door of the machine on which the dispensing tap is mounted, and also have disadvantages of an aesthetic/commercial nature, in so far as the consumer cannot observe the contents of the machine during the phases of operation.

Machines for making crushed ice drinks are known which comprise a transparent tank with horizontal axis, provided at one end with a dispensing tap, and within which is housed a refrigerating element consisting of a metal cylinder closed at both ends, and internally housing the evaporator of a refrigerator unit. This cylinder also is arranged in the tank with its axis horizontal. Right around the said cylinder is arranged a motor-driven screw which rotates so as continuously to push the product towards the end of the tank bearing the dispensing tap.

U.S. Pat. No. 4,900,158 describes a machine for making crushed ice drinks comprising a transparent tank, preferably made of plastic, provided at one end with a tap for dispensing the frozen product, and internally housing a refrigerating element consisting of a hollow metal cylinder with double-walled shell housing the evaporator of a refrigerator unit in the gap between the two walls. In the axial cavity of this cylinder is housed a first screw, while its outer shell is surrounded by a second screw, and these two screws are driven in opposite directions by a motor, so as to transport the mixture to be frozen in a continuous motion from one end of the cylinder to the other through its axial cavity and along its outer shell.

Machines designed in this way have numerous advantages as compared with the state of the art and, in the machine according to U.S. Pat. No. 4,900,158 for example, there is undoubtedly better utilization of the cold generated by the evaporator, as compared with the other machines examined earlier. However, both the machine according to the cited U.S. Patent and the other known machines with freezing cylinder with horizontal axis have some drawbacks. This is because, not infrequently in machines of this type, accumulations of product may occur in proximity to the delivery end of the tank of the machine. Moreover, the outlet thrust exerted on the product may not be entirely effective and such as to ensure regular delivery through the dispensing tap placed at the head of the machine.

To remedy these and other drawbacks, the present invention provides a machine for making crushed ice drinks which comprises stirrer means able to avoid the accumulation of product at the head end of the machine and which moreover provide an adequate thrust on the product as it comes out of the dispensing means.

The subject of the present invention is therefore a machine for making crushed ice drinks comprising a tank with horizontal axis provided at one end with means for dispensing the iced product, and internally housing a refrigerating element consisting of a hollow metal cylinder with double-walled shell housing the evaporator of a refrigerator unit in the gap between the two walls. A screw is housed in the axial cavity of the said cylinder, while its outer shell is surrounded by a stirrer/scraper element consisting of one or more radial ribs or fins parallel to the directrices of the cylinder a series of blades able to exert a positive axial thrust on the product to be delivered towards the said dispensing means also being provided at that end of the said stirrer device facing the dispensing means of said tank. Advantageously, the said scraper ribs or fins and the said blades are connected together.

Advantageously the outer stirrer means act concurrently as elements for scraping the outer shell of the freezing cylinder. Alternatively, it is possible to provide means for scraping the outer surface of the refrigerating element which are separate from the stirrer elements.

In one embodiment of the invention, the said blades are mounted at the free end of radial arms which depart from a hub for connection to the screw, the stirrer fins being connected to the same end of said arms.

In a further embodiment, the said scraper means are provided on the inner edge of the stirrer fins, said fins being provided with support bars which are connected at one end to the said radial arms and which bear, in proximity to the opposite end, a ring which contributes to the stiffening of the structure.

In another embodiment of the invention, the said scraper means are mounted separately from the said fins and are sandwiched between two rods welded at one end to one of the said radial arms, and at the other end to the said ring. In this case, the said ring no longer merely fulfils the function of structural stiffening, but also that of supporting the outer stirrer means which are ill-balanced; such support is obtained by resting the said ring on a circular support element integral with the said tank.

One of the stirrer fins can be substituted by an oscillating vane hinged to a bar connected to one of the said radial arms and to the said ring.

BRIEF DESCRIPTION OF THE DRAWINGS

Further advantages and characteristics of the present invention will emerge from the following description of some embodiments of same, which description is given for exemplary and non-limiting purposes, with reference to the attached drawings in which:

FIG. 1 is a side elevation with parts in section of a first embodiment of the machine according to the invention;

FIG. 2 is a perspective view of the stirrer means outside the refrigerating cylinder in the embodiment illustrated in FIG. 1;

FIG. 3 is a view in cross-section along the line III—III of FIG. 1;

FIG. 4 is a view in cross-section along the line IV—IV of FIG. 1;

FIG. 5 is a view in longitudinal section of a second embodiment of the machine for making crushed ice drinks according to the invention;

FIG. 6 is a perspective view of the stirrer means outside the refrigerating cylinder in the embodiment illustrated in FIG. 5, and FIGS. 7A and 7B illustrate, in cross-section along the line VII—VII of FIG. 5, two phases in the operation of the stirrer means illustrated in FIGS. 5 and 6.

DESCRIPTION OF A FIRST EMBODIMENT OF THE INVENTION

Illustrated in FIG. 1 is a first embodiment of the machine according to the invention. Such a machine comprises a tank 1 having a substantially U-shaped profile in cross-section, closed off at its rear by an end wall and at its front by a suitable door carrying the dispensing tap 6. Such a tank is preferably made from a transparent plastic, and is supported with its axis horizontal, its upward facing open part being closed by a suitable cover (201 in FIG. 5). Inside the tank 1 is arranged a refrigerating element consisting of a hollow metal cylinder 2 with double-walled shell 102 housing the evaporator 112 of a refrigerator unit (not illustrated) in the gap between the two walls. Such a cylinder 2 is supported inside the tank 1 some distance both from the bottom and from the side walls of same by way of two side support elements 202 secured to the end wall of the tank. Inside the said cylinder 2, in the cavity delimited by the shell 102, is installed a screw 3, whose drive shaft projects outside from the rear wall of the tank 1, passing through a suitable stuffing box, and is connected to the drive shaft 5 which in turn is connected, by way of the pulley 205 keyed thereto, to a motor (not shown). At the opposite end the said screw 3 is coupled up to the hub 214 of the frame of the outer stirrer means 4. Such outer stirrer means 4 comprise, in the case illustrated, (see also FIG. 5) three longitudinal scraper/stirrer fins 104 symmetrically arranged radially around the refrigerating element 2 and connected to bars 204 with appropriate fixing means 214. The said bars are welded at one end to the radial arms 404 which depart from the hub 414 which allows connection to the screw 3. The radial arms carry at their ends a corresponding number of helical blades 424 whose function will be described below. In proximity to the opposite end of the bars from that which is connected to the arms 404, the bars 204 are welded to a ring 304 whose purpose will be described below.

Illustrated in FIG. 2 in perspective are the outer stirrer means 4 of the machine according to the invention. As already described earlier, the said outer stirrer means 4 comprise three fins 104, secured to the support bars 204 by way of fixing means 214. The said bars 204 are each connected at one end to the respective free ends of three arms 404 which depart radially from the hub 414. Three paddle blades 424 with helical development, each of which spans around 120° of arc, are connected to the ends of the said arms. In proximity to the opposite end from the arms 404/hub 414 assembly, a ring 304 is welded to the bars 204, so as to stiffen the structure of the outer stirrer means 4. The fins 104 have a continuous outer edge 134 and a discontinuous inner edge formed by rims 114 which scrape the shell of the cylinder 2 alternating with hollows 124. The positions of the rims and hollows are mutually staggered on the various fins 104.

Illustrated in FIG. 3 in cross-section are the fins 104 in action on the outer surface of the refrigerating element 2, while illustrated in FIG. 4 are the blades 424 in front view.

DESCRIPTION OF A SECOND EMBODIMENT OF THE INVENTION

FIG. 5 depicts, in longitudinal section, a machine for making crushed ice drinks according to a second embodiment of the invention. Identical parts of the two embodiments illustrated have been assigned identical reference numbers. This embodiment has, like the first, a tank 1 with substantially horizontal symmetry, provided with dispensing means 6, a refrigerating cylinder 2 located horizontally inside the said tank 1, and provided with inner stirrer means, that is to say the screw 3, which are connected to the motion transmission axle 5, which is in turn connected through the pulley 5 to drive means (not illustrated). The screw 3 is engaged with the outer stirrer means 7 via the pin 203. The outer stirrer means 7 comprise (see also FIG. 6) two fins 407 each connected at one end to a radial arm 207 which departs from the hub 217, and at the opposite end to the ring 307; this ring rests on the extensions 317 of the supports 202 of the cylinder 2. Moreover, the said outer stirrer means 4 comprise a vane 107 connected in the manner described below to one of the two rods 327 which at one end are welded to the ring 307 and at the other end are welded to an arm 207; two scraper elements 504 are also housed between the said rods. Blades 227 whose purpose will be illustrated below are located at the ends of the radial arms 207 connected to the fins 407 or to the rods 327.

Illustrated in FIG. 6 is the outer stirrer means unit 7. As already described earlier, this unit comprises at one end three arms 207 which depart radially from the hub 213, and to whose ends are connected three blades 227. Two of these blades 227 are connected at one end, with appropriate fixing means, to the fins 407, which at the opposite end are fixed to the ring 307. Between the two fins 404, the ring has two welded rods 327 which at the opposite end are connected to the blade 224 which is free; two scraper elements 507 are inserted between the rods 327. Two bushes 117 which support the bar 127, to which the stirrer vane 107 is hinged, are welded to the outer edge of one of the said rods 327. This vane 107, as illustrated in FIGS. 7A and 7B, is held in a vertical position by the spring 137.

DESCRIPTION OF THE OPERATION OF THE MACHINE ACCORDING TO THE INVENTION

The operation of the machine according to the present invention will become clear from what follows. With reference firstly to the embodiment illustrated in FIG. 1, the tank 1 is loaded with the mixture for the production of crushed ice drinks, then the refrigerator circuit and the stirrer means are actuated. The screw 3 continuously transfers liquid inside the cylinder 2 and removes solids, or semi-solids from inside the cylinder 2 to the outside. The outer stirrer means 4, which are connected to the screw 3 by the coupling of the pin 203 in the hub 214, should then make the situation outside the cylinder uniform, distributing the solids produced by the action of the refrigerating cylinder 2 as homogeneously as possible down the entire length of the cylinder. During the rotation of the stirrer means of the machine, the fins 104 allow adequate churning both in the region above the cylinder 2 and in that below it, as illustrated in the cross-section of FIG. 3. Moreover, the fins 104 scrape the outer surface of the shell 102 of the cylinder 2, by virtue of the rims 114 which are in contact with the said surface. Advantageously, the rims 114 of one fin 104 are staggered with respect to those of another fin, in such a way as to guarantee complete scraping of the outer surface of the cylinder 2.

Moreover, in the embodiment of FIG. 1, the blades 424 connected to the free ends of the radial arms 404 are shaped with helical development in such a way as to cover an arc of about 120° (see FIG. 4). In this way they exert a paddle action which pushes the solid material in an axial direction towards the dispensing tap 6.

The ring 307 welded to the bars 207 serves solely to stiffen the structure of the outer stirrer means 4.

The operation of the embodiment illustrated in FIG. 5 is analogous. In particular, the vane 107, with which one of the stirrer fins of the embodiment described previously has been substituted, allows optimum mixing of the upper layers of the contents of the tank 1. As illustrated in FIGS. 7A and 7B, the vane 107, when facing the cover 201 of the tank, is kept vertical by the spring 137; the same spring forces it against the end wall of this tank as illustrated in FIG. 7B, thereby allowing the scraping of the said walls. Moreover, as illustrated in the same figures, the scraper elements 507 effectively carry out their function on the outer surface of the cylinder 2. In this case however, with the said scraper means being present on only one stirrer element, it is necessary for the outer stirrer means assembly 7 to be supported, so that the fins 407 do not touch the outer surface of the refrigerating element. For this purpose the ring 307 is supported on the bush-type support element 317 connected to the wall of the tank 1.

At their free ends, the outer stirrer means 4 have, as in the embodiment illustrated previously, arms 207 which depart radially from the hub 217 of the blades 227, which fulfil the same function fulfilled by the blades 424; the shape of the blades 227 is purely by way of indication and may also be the same as that of the blades illustrated previously.

Obviously, although in both the above embodiments, outer stirrer means comprising 3 stirrer fins and 3 thrust blades have been represented, it is possible for analogous devices to be configured with a different number of fins and/or blades, while still remaining within the scope of the present invention.

The machine for making crushed ice drinks constructed according to the invention therefore makes it possible to obtain uniform stirring, distributed uniformly along the whole of the tank, of the product in the freezing phase. It moreover makes it possible to avoid accumulations of product at the head end of the tank, and also makes it possible to intensify the thrust of the product towards the dispensing means. Additionally, the machine thus designed has greatly simplified constructional features as compared with the devices known to the state of the art.

We claim:

1. Machine for making crushed ice drinks comprising a tank with horizontal axis provided at one end with means for dispensing the iced product, and housing internally a refrigerating element consisting of a hollow metal cylinder with double-walled shell housing the evaporator of a refrigerator unit in the gap between the two walls, a transporter screw being housed in the axial cavity of the said cylinder, characterized in which the outer shell of the said cylinder is surrounded by a stirrer element consisting of one or more radial ribs or fins parallel to the directrices of the cylinder which are made to rotate right around the said cylinder, a series of blades able to exert a positive axial thrust on the product to be delivered towards the said dispensing means also being provided at that end of the said stirrer element facing the dispensing means of the said tank.

2. Machine according to claim 1, in which in addition to the said stirrer element scraper means are provided which are able to scrape the outer surface of the refrigerating element.

3. Machine according to claim 2, in which the said scraper means consist of the inner edge of the said radial fins.

4. Machine according to claim 2, in which the said scraper means consist of elements independent of the said radial fins.

5. Machine according to claim 1, in which the said fins are connected, on that side facing the tank dispensing means, to radial arms which depart from a hub which connects the stirrer element to the transporter screw, and on the other side to a ring.

6. Machine according to claim 5, in which the said blades are each mounted on one of the radial arms which depart from the connecting hub.

7. Machine according to claim 6, in which the said blades have helical development.

8. Machine according to claim 5, in which the said ring is placed in proximity to the opposite end from that facing the tank dispensing means and acts as a stiffening elements.

9. Machine according to claim 5, in which the said ring is placed at the opposite end from that facing the tank dispensing means and acts, in cooperation with a tank support element, as a support for the said stirrer element.

10. Machine according claim 1, in which one of the stirrer fins is substituted by or incorporated with a hinged vane oscillating on a rod connected to the said stirrer element.

* * * * *